United States Patent [19]
Anderson et al.

[11] 3,963,826

[45] June 15, 1976

[54] LOW TEMPERATURE, LOW PRESSURE HYDROGEN GETTERING

[75] Inventors: D. Richard Anderson; Robert L. Courtney; Larry A. Harrah, all of, Albuquerque, N. Mex.

[73] Assignee: The United States of America as represented by the United States Energy Research and Development Administration, Washington, D.C.

[22] Filed: Mar. 21, 1975

[21] Appl. No.: 560,846

Related U.S. Application Data

[62] Division of Ser. No. 443,077, Feb. 15, 1974, Pat. No. 2,896,042.

[52] U.S. Cl. .................................. 423/248; 316/25; 427/216; 427/220; 427/221; 427/203; 427/205; 427/388; 427/398; 427/230; 428/403; 428/407

[51] Int. Cl.$^2$ ........................ C01B 1/26; B01J 1/14

[58] Field of Search .......... 427/216, 220, 221, 203, 427/205, 230, 388, 398; 316/25; 252/181.6, 184, 430, 472; 423/248; 428/403, 407

[56] References Cited

UNITED STATES PATENTS

| | | | |
|---|---|---|---|
| 3,455,845 | 7/1969 | Wicks et al. | 252/472 |
| 3,467,493 | 9/1969 | Eguchi et al. | 423/248 |

*Primary Examiner*—Ralph Husack
*Assistant Examiner*—Dennis C. Konopacki
*Attorney, Agent, or Firm*—Dean E. Carlson; Dudley W. King; Ignacio Resendez

[57] ABSTRACT

The invention relates to the gettering of hydrogen and its isotopes, the gettering materials being painted or coated onto, or otherwise disposed in an area or volume from which hydrogen is to be removed.

9 Claims, No Drawings

3,963,826

LOW TEMPERATURE, LOW PRESSURE HYDROGEN GETTERING

This is a division of application Ser. No. 443,077, filed Feb. 15, 1974, now U.S. Pat. No. 2,896,042.

BACKGROUND OF INVENTION

The invention relates to a novel system and method for hydrogen gettering.

Hydrogenation process which include the use of catalysts such as palladium, platinum, nickel, etc., are known in the art. These processes generally employ liquids or gases and require specialized equipment for converting unsaturated organic materials to saturated organic materials. Further, depending upon the nature of the catalyst, either high temperatures or high pressures or both may be required.

In some instances it is desirable to remove or getter hydrogen from atmospheres or environments wherein it is not feasible to provide for high temperatures or high pressures or to employ a fluid gettering material. As used herein, removal of hydrogen includes removal of hydrogen isotopes such as tritium and deuterium. For example, the pressence of hydrogen within a closed system may indeed be a real problem since it can be very detrimental to other components, such as vacuum tubes, of the system. In these systems, there may be several possible sources for the generation of hydrogen. A prominent source is the reaction of water vapor, or moisture, with aluminum or other active metal housings or liners. This would also apply to any other material incorporating aluminum or any other metal, which when oxidized, may generate hydrogen gas.

In closed volumes where hydrogen may be detrimental, there is no generally known and satisfactory hydrogen trapping, removing or gettering material which may be employed that does not regenerate moisture or have other disadvantages such as forming pyrophoric or corrosive materials. For example, attempts to use platinum or palladium exclusively may be undesirable since platinum and palladium will absorb hydrogen to form platinum and palladium hydrides, which compounds are objectionably pyrophoric, i.e., they will react with air explosively oxidizing the hydride.

Dessicants have also been used to control the moisture content in closed systems. The use of an absorber type of dessicant such as zeolite to control moisture content has a drawback in that this is a reversible process which means that at some point equilibrium is attained and the dessicant is no longer capable of removing further moisture from the system. At this point the hydrogen content begins to increase, possibly reaching a dangerous level either to personnel or to components of said closed system. Another drawback in using another type of dessicant such as a reactive type of dessicant like phosphorous pentoxide is that the reaction product may be a corrosive material incompatible with or detrimental to surrounding equipment.

Therefore, closed volumes containing hydrogen and its isotopes may be detrimentally affected by their presence. In short, the problem is a result of a lack of suitable materials and methods to remove hydrogen without accompanying detrimental side effects.

SUMMARY OF INVENTION

In view of the above prior art problems and limitations, it is an object of this invention to provide a novel system useful at low temperatures and low pressures for removing or gettering hydrogen from environment or atmospheres wherein said hydrogen may be detrimental.

It is a further object of this invention to provide for removing hydrogen from environments or atmospheres having a hydrogen paritial pressure of about $10^{-6}$ atmospheres to hydrogen partial pressures of greater than about two atmospheres.

It is a further object of this invention to provide novel organic materials which have low vapor pressures and are suitable for removing hydrogen and its isotopes at the above partial pressures and at temperatures of less than $-50°C$ to greater than about $110°C$, and preferably at between about $-4°C$ and about $71°C$.

It is a further object of this invention to provide a novel hydrogen gattering system that does not objectionably regenerate moistue nor form pyrophoric materials upon exposure to hydrogen environment.

It is a further object of this invention to provide a hydrogen gettering material which may be applied as a coating or by painting onto structure walls to remove hydrogen and its isotopes.

It is a further object of this invention to provide novel hydrogen gettering suitable for incorporating in potting and encapsulating organic materials used in systems adversely affected by hydrogen.

Various other objects and advantages will appear from the following description of the invention, and the most novel features will be particularly pointed out hereinafter in connection with the appended claims. It is to be understood that various changes in the details, materials, process steps and the like which are herein described and illustrated in order to explain the nature of the invention, may be made by those skilled in the art without departing from the scope of the invention.

The invention includes coating a hydrogenation catalyst with an active unsaturated organic material. The active unsaturated organic material may be either dissolved in a suitable solvent prior to coating the hydrogenation catalyst to form a slurry, followed by evaporating the solvent from the slurry and thereafter drying the resultant powder material, or the active unsaturated organic material may be heated until melted and the hydrogenation catalyst directly coated therewith and cooled. The resultant material which is the hydrogen getter may be disposed in the environment from which the hydrogen is to be removed in any desired manner such as by mixing with a carrier or binder and painting or coating walls or components with the mixture, by disposing within perforate containers or by incorporating in a polymer to give a material capable of being compacted into pellets or sheets, or of being used in potting or encapsulating components in structural or filler forms.

DETAILED DESCRIPTION

A suitable getter for this invention may be prepared by heating an active unsaturated organic material until molten and then contacting a suitable hydrogenation catalyst with the melt until the hydrogenation catalyst is coated, and subsequently cooling the mixture of coated catalyst and active unsaturated organic material. An alternate method for preparing this getter comprises mixing or dissolving an active unsaturated organic material in a suitable solvent such as benzene, xylene, acetone or toluene and the like and to this solution adding a suitable hydrogenation catalyst in powder or comminuted form, followed by sufficient stirring, mixing, agitation or the like until the catalyst is thoroughly coated with the unsaturated active organic material. It may be desirable for the hydrogenation catalyst described herein to have a maximum of surface area, such as about greater than 15 square meters surface area per gram of catalyst, although particles of larger size may be used depending upon the particular applications. The solvent is thereafter evaporated from the slurry. The active unsaturated organic material may be any double or triple bonded organic compound which is solid within the temperature range ordinarily encountered by the product within which it is to be used, has a sufficiently low vapor pressure such that at least 90% of the active unsaturated organic material remains on the surface as a coating at the end of a desired operating period, e.g., 10 years, at operating temperature and pressure, such as about 50°C at atmospheric pressure, and which will hydrogenate in the presence of a hydrogenation catalyst at low temperature and pressure. For example, a suitable solid, diacetylenic compound capable of removing a few parts per million (ppm) or less of hydrogen including any of its isotopes from within a catalyst system by way of catalyst chemical reaction is dimerized propargyl phenyl ether (DPPE) having the formula:

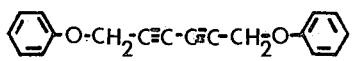

This compound, which may also be referred to as 1,6-diphenoxy-2,4-hexadiyne, reacts with hydrogen in the presence of a suitable hydrogenation catalyst such as platinum or palladium in accordance with the following equation:

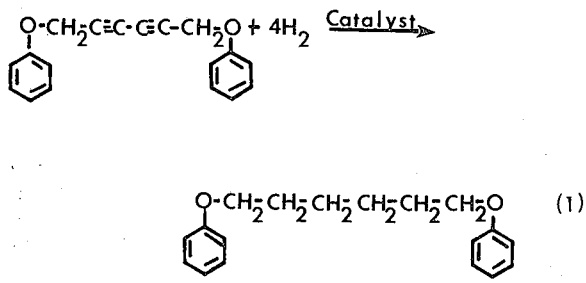

In accordance with equation 1, one mole of DPPE which has a density of about 1.15 grams per cubic centimeter, can remove four moles of hydrogen. It should be noted that propargyl phenyl ether (PPE) itself will hydrogenate when a suitable hydrogenation catalyst is incorporated therein, but it is a liquid with a high vapor pressure in the desired temperature and pressure range.

Since an insoluble catalyst is used, the catalytic process may be termed heterogeneous catalysis. It may be desirable to form a homogeneous catalytic hydrogen gettering system by combining an active unsaturated organic material with a suitable hydrogenation catalyst in solution as a complex. The resultant solidified product may be used as a hydrogen getter material.

Although DPPE is used in this example, there are many aryl, alkyl and other organic groups that may be attached to the carbon atoms which contain the unsaturated bonding. A factor of concern in selecting the organic group to be used is vapor pressure over the desired temperature and pressure range. Large hydrocarbon content groups are favored in order to lower the vapor pressure of the resultant active unsaturated organic material and thus retard or minimize the evaporation rate of the active unsaturated organic material from the catalyst. Materials having low vapor pressure coat the hydrogenation catalyst particles and retard run-off of the material from the catalyst.

The coverage of catalyst with the organic material reduces the reactivity of the hydrogen-oxygen reaction at the catalyst surface such that the rate of the unsaturated materials reaction with hydrogen far exceeds that with oxygen.

DPPE may be prepared by reacting phenol and potassium hydroxide by heating to a suitable temperature such as from about 90° to about 130°C and preferably from about 120° to 130°C to prepare potassium phenoxide. The potassium phenoxide may then be cooled to room temperature and reacted with propargyl chloride (3-chloropropyne) which, if desired, may be diluted with a suitable solvent such as toluene in order to reduce or minimize the violence of the reaction. After this addition, the reaction mixture may be refluxed for from about 4 to about 16 hours at from about 65° to about 90°C to accomplish formation of propargyl phenyl ether (PPE). The resultant reaction mixture may then be poured into water and the PPE taken up with ethyl ether. The ether layer may then be washed with an aqueous base such as greater than about 0.1 normal sodium hydroxide and thereafter dried by any suitable process such as with magnesium sulfate. The ether solvent may then be distilled or otherwise evaporated from the PPE product. Yields of PPE product equal to and exceeding 98.7% have been obtained.

In order to form DPPE, the following procedure may be used. Oxygen is passed through a solution of copper (I) chloride and pyridine and the PPE product added. Oxygen flow may be continued until the dimerization of the PPE to DPPE is complete. The pyridine solvent may be then evaporated from the reaction mixture by heating to greater than about 115°C. DPPE may be purified by repeated washings with suitable alcohols such as methanol containing a small amount of hydrochloric acid such as from about .1 to about 0.3 molar hydrochloric acid. The resultant white product may be dried through suitable known procedures such as by heating to about 25°C and maintaining under vacuum. Yields of DPPE equal to and exceeding 96% have been obtained. In one example of the procedure described above for making DPPE, 2.37 grams of PPE was added to the oxygenated, stirred solution containing 0.60 gram of copper (I) chloride in about 125 milliliters (ml) of pyridine. Equations 2,3 and 4 below generally represent the equations involved to obtain DPPE.

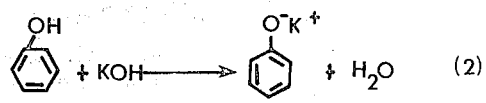

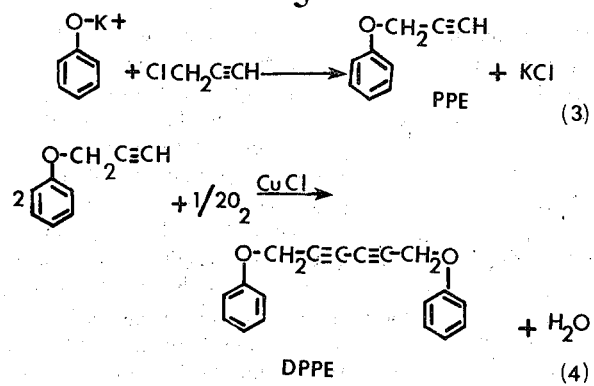

Other dimerized systems include such as dimerized benzylacetylene, dimerized phenylpropiolate and similar acetylene derivatives.

Another dimerized system which has been successfully used in this invention is dimerized biphenyl propargyl ether (1,6-bis(4-phenylphenoxy)-2,4-hexadiyne) prepared in a manner similar to the preparation of DPPE above. For example, 4-hydroxybiphenyl was added to potassium hydroxide in a suitable alcohol such as methanol as shown in Equation 5. The product of Equation 5 was refluxed with propargyl chloride (Equation 6) forming biphenyl propargyl ether at 90–95% yield. This product was dimerized (Equation 7) by passing oxygen through a solution of copper (I) chloride, pyridine and the product of Equation 6. The dimerized product has a melting point of about 158° to 159°C and is obtained at 90–95% yields as per Equation 7. It should be noted here that biphenyl propargyl ether, which has a melting point of about 77.5°C, may also be used as the active unsaturated organic material.

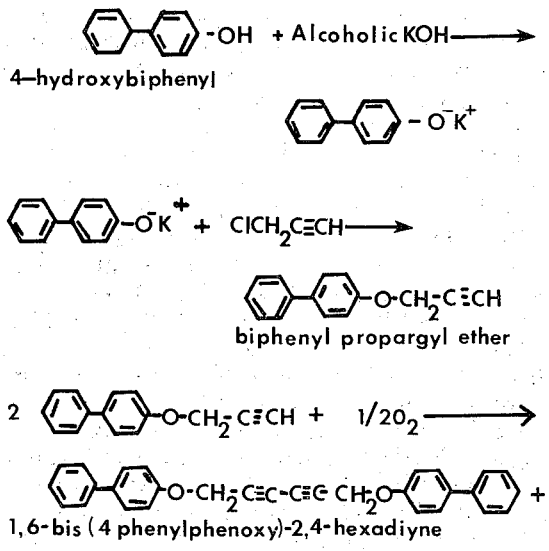

In an alternate method for preparing DPPE, 1.0 gram of copper (I) chloride and 1.2 grams of N, N, N', N' tetramethylethylene diamine was added to about 135 ml of acetone at a temperature of from about 23 to about 30°C and preferably at about 28°C. The solution was vigorously stirred by passing oxygen therethrough. About 25 grams of PPE was added incrementally over a 15 minute period and the passing of oxygen gas through the solution was continued for approximately 20 minutes after the desired amount of PPE had been added. The acetone was thereafter evaporated and about 20 ml of water containing about 1 ml of concentrated hydrochloric acid was added to the residue. The white precipitate which formed was subsequently filtered and washed and dried and resulted in about 23 grams of DPPE having a melting point of about 80°C.

DPPE, when combined or mixed with a hydrogenation catalyst, may be used to getter hydrogen at hydrogen partial pressures of from about $10^{-6}$ atmospheres to hydrogen partial pressures of greater than 2 atmospheres. In practical applications, whether or not DPPE may be used at a particular low temperature will be dependent upon the hydrogen generation rate. For example, if this rate is small, DPPE would be practical at and below −50°C. Further, even though DPPE melts at about 80°C and cross linkage may be initiated at about 120°C, hydrogenation may still occur at higher temperatures, such as at 150°C, for a few minutes until cross linking is complete. The maximum efficiency temperature gettering range wherein there is a high hydrogen generation rate has been found to be between about −4°C and about 71°C, but this temperature range is not intended to be restrictive.

Suitable catalysts which may be used for forming the slurry with the unsaturated active organic material are such as platinum black, palladium black, platinum on asbestos, platinum on calcium carbonate, palladium on asbestos, palladium on calcium carbonate, soluble noble metal chelates, and organometallic complexes such as dichloro-bis (triphenyl-phosphine) platinum, dichloro-bis (triphenylphosphine) palladium (II) and other formulations containing an active hydrogenation metal catalyst either alone or laid down on a porous substrate at various weight fractions such as 95 weight percent asbestos, 5 weight percent palladium or 95 weight percent calcium carbonate and 5 weight percent palladium, or containing an active metal ion either alone or laid down on a porous substrate. Metals which may be used as hydrogenation catalysts in this invention include those metals and alloys thereof found in group VIII of the periodic table as listed in the *Handbook of Chemistry and Physics*, 54th Edition, 1973, CBC Press, Cleveland, Ohio. For maximum efficiency in hydrogen gettering, however, hydrogenation catalysts such as palladium and platinum may be preferred.

A polymer having a molecular weight determined by gel permeation chromotography of between 4,000 and 5,000 has been prepared by first mixing about 45.6 gm of 2,2 bis(4-hydroxyphenyl)propane with about 26.4 gm of potassium hydroxide dissolved in about 300 ml of methanol, heating to a temperature of from about 60° to about 80°C for from about 3 to about 5 hours, thereafter adding about 30 ml of propargyl chloride to the product of the first reaction, heating to from about 60° to about 80°C for from 10 to about 15 hours, thereafter repeating these steps using one half of the quantities of potassium hydroxide and propargyl chloride to remove the residual hydroxide and form the dipropargyl ether of bisphenol-A. Then a polymer is prepared by oxidative coupling in a similar manner to the preparation of DPPE. The polymer has a repeat unit whose structure is:

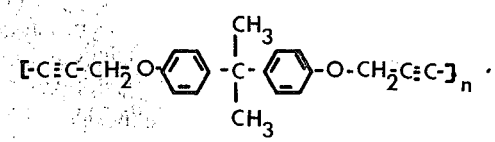

This polydipropargyl ether of bisphenol-A polymer may be dissolved with a suitable solvent, such as benzene, and thereafter the resultant solution may be used to coat the hydrogenation catalyst and the solvent thereafter evaporated therefrom.

The efficiency of the above polymeric hydrogen getter having the acetylenic bonds incorporated therein was tested by disposing three ml of water in a glass reaction chamber having a volume of about 400 ml. Aluminum filled epoxy discs were placed in the chamber on a perforate glass support disposed above the water. Also disposed within the glass reaction chamber was a glass vial containing about 0.5 gram of polymeric hydrogen getter. This getter comprises 0.50 gram of polymer which were dissolved in benzene and the resultant solution used to coat one gram of a hydrogenation catalyst comprising calcium carbonate containing 5 weight percent palladium. The getter used in the run was produced by evaporating the benzene from the polymer/catalyst mixture. In a separate glass reaction chamber, similar quantities of water and aluminum filled epoxy discs were placed but this time without the above polymeric hyrogen getter. After one week, the control chambr had 600 ppm of hydrogen whereas the chamber having polymeric hydrogen getter had 0 ppm of hydrogen. At the end of 2 weeks, the control chamber had approximately 1050 ppm of hydrogen whereas the chamber containing the polymeric hydrogen getter still had 0 ppm. After a 2 month period the control chamber had approximately 1260 ppm and chamber containing polymer had 10 or less ppm.

Coatings containing DPPE have removed hydrogen at a partial pressure of less than about 10 ppm. Although the DPPE will melt at about 80°C, it may still be useful up to about 110°C to remove hydrogen from the environment. This compound decomposes at about 120°C.

As an example of getter preparation, one gram of DPPE was dissolved in about 50 ml of toluene and 4 grams of 5% palladium-calcium carbonate catalyst were added. The slurry was mixed or stirred until evaporation of the toluene was complete. The air dried mixture was further dried at about 25°C in a vacuum oven. The resultant powdery material is capable of gettering a total of about 0.0153 gram of gaseous hydrogen (or 0.0306 gram of deuterium or about 0.0459 gram of tritium). This gives a gettering weight efficiency of 20% DPPE concentration of about 0.003 gram of hydrogen per gram of getter.

The subject matter of this invention is particularly useful in the removal of hydrogen from environments which are at relatively low temperatures and below one atmosphere pressure, as described herein. The examples given, both monomeric and polymeric in nature, employ acetylenic derivatives having the generic formula R—C≡C—R', where R and R' may be the same, or H, or other alkyl, aryl and the like organic groups, as described herein. Acetylenic derivatives having the above generic formula may be used with a catalyst and a polymeric binder to form pellets, sheets, etc., of material capable of acting as hydrogen isotope getter. Typical polymers which may incorporate acetylenic derivatives as mixtures in the polymer, or as part of the main chain or in side chain branches, include polystyrene, polyacrylonitrile, and other hydrocarbon, vinyl, epoxy, urethane, and thermoplastic rubber polymers.

Since, as described above, the active unsaturated organic group which is to getter hydrogen may be mixed into, or incorporated as a part of, various polymeric compounds, it should be obvious that these could be potting, encapsulating or other structural materials and, these, together with suitable amounts of a hydrogenation catalyst, could be used in lieu of presently used materials. This aspect is important where it would not be desirable to add additional weight, such as in space applications. The result is that the potting, encapsulating or other member could be used both as structural members and as hydrogen getters.

As stated herein, the hydrogen gettering material and method of this invention may be applied as a coating, may be used as formed, or may be comminuted to a powder of various sizes and concentrations as desired, such as one containing 20% by weight of DPPE with the balance comprising 95 weight percent calcium carbonate and 5 weight percent palladium, this resulting getter having a surface area of about 5 square meters per gram.

Virtually any ceramic (fiberbrick, alumina) carbon, or inert high surface area material (e.g., calcium carbonate above) may be used as a substrate for the hydrogenation catalyst (e.g., 5 weight percent palladium above), the combination of substrate and catalyst being thereafter mixed with the active unsaturated organic material to form the hydrogen getter. The ratio of solid organic material to catalyst is variable and is preferably selected such that the gettering reaction is as fast or faster than the hydrogen producing reaction. An increase in the hydrogenation catalyst in the getter effects an increase in the gettering ability as would be expected. For example, various weight ratios of DPPE to catalyst on calcium carbonate substrate (5% palladium, 95% calcium carbonate) such as from about 20 to about 75 weight percent DPPE to from about 80 to about 25 weight percent of 5 weight percent palladium – 95 weight percent calcium carbonate have been successfully used. The 20 weight percent DPPE – 80 weight percent catalyst on substrate ratio was extremely efficient in gettering hydrogen. Other catalyst concentrations may be likewise varied depending upon the requirements of the application. Thus, as an illustration, from one milligram to 300 milligrams of palladium black or platinum black may be used per gram of solid organic material. The limits are not intended to be restrictive but merely to exemplify possible ratio ranges. These ranges may be broadened as required. DPPE has likewise been used at various weight percent ratios with a hydrogenation catalyst on an asbestos substrate, especially in areas where heat is generated.

Although acetylenic derivatives in combination with hydrogenation catalysts may be preferred, it may also be possible to use partially reduced acetylenic derivatives of the type

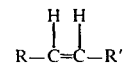

as the active unsaturated organic. Here R and R' may be Ar—O—CH$_2$—,

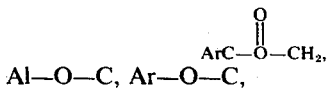

or Ar—O—CH$_2$—HC=CH—. These are merely exemplary and there may be other variations that could be employed. In these formulae, Ar refers to an aromatic group such as the phenyl group and Al refers to an aliphatic residue such as an ethyl or propyl group.

The getter material formed as described and used herein may be used to getter hydrogen and its isotopes such as tritium and deuterium at any location, container, closed volume, or the like, where it may be placed, e.g., as a coating, encapsulant, potting compound, by spraying onto a wall or other structure, etc. For example, by placing getter material as a coating on walls, components or structures of reactors or nuclear pipelines, it serves to remove or getter tritium from the surrounding environment. In this example, it may be desired to support the getter with palladium or the like on fire resistant or insulative material such as asbestos. Since the pipelines or the like may be hot, the getter material may be placed directly on the pipe insulation or at the outer surface of the pipe insulation material, such as by wrapping or spraying with insulator containing the tritium gettering system. The getter material may likewise be a coating within storage batteries to capture hydrogen released therein and perhaps avoid explosion which may occur if the battery vent fails to open. The getter material may also be used as an encapsulant or potting compound, or incorporated in same to capture hydrogen and thus prevent its permeation through glass vacuum tubes which would otherwise render them inoperative.

Using the hydrogen getter material of this invention, hydrogen has been removed from an environment to levels less than about ½ part per million at atmospheric pressure. Equipment inadequacy prevents exact determination of parts per million. However, tritium content, which can be detected in much easier fashion, using the hydrogen getter of this invention, has been reduced to less than $10^{-6}$ part per million at atmospheric pressure.

The getter material as described herein is very selective to hydrogen and its isotopes, getters hydrogen by chemical reaction rather than by adsorption, does not regenerate moisture and is non-reversible in the environment in which it is used, thus overcoming prior art getter material drawbacks.

What is claimed is:

1. In the method of gettering hydrogen and its isotopes including deuterium and tritium, by preparing a hydrogen getter which comprises coating a hydrogenation catalyst selected from the group of metals consisting of group VIII of the periodic table and alloys thereof with an active unsaturated organic material taken from the group consisting of dimerized propargyl phenyl ether, dimerized benzylacetylene, dimerized phenylpropiolate, dimerized biphenyl propargyl ether and polydipropargyl ether of bisphenol-A polymer.

2. The method of claim 1 which includes the step of employing said coated hydrogenation catalyst at hydrogen partial pressures of from about $10^{-6}$ atmospheres to about 2 atmospheres and at temperatures of from about −50°C to about 110°C.

3. The method of claim 1 wherein said coating is achieved by dissolving said organic material in an organic solvent to form a solution, mixing in said solution said hydrogenation catalyst to form a mixture, agitating said mixture to form a slurry, and thereafter drying said slurry to evaporate said solvent yielding said hydrogenation catalyst encapsulated in said organic material.

4. The method of claim 3 which includes the step of coating the walls of a system in which hydrogen concentration is to be minimized with said slurry prior to said drying.

5. The method of claim 3 wherein said organic material is dimerized propargyl phenyl ether in one gram quantity, said organic solvent is toluene in 50 milliliter quantity, said catalyst is palladium in four gram quantity of 5 weight percent palladium – 95 weight percent calcium carbonate, and the resultant hydrogen getter is sufficient to getter about 0.0153 gram of gaseous hydrogen.

6. The method of claim 1 which includes the step of the hydrogen getter with a polymeric binder selected from the group consisting of polystyrene, polyacrylonitrile, vinyl, epoxy and urethane polymers.

7. The method of claim 1 wherein said catalyst is at least one of the metals palladium and platinum in powder form having a surface area greater than about 15 square meters per gram.

8. The method of claim which includes the step of supporting said hydrogenation catalyst on a porous inert substrate selected from the group consisting of asbestos, calcium carbonate, ceramic and carbon.

9. The method of claim 1 wherein said organic material comprises dimerized propargyl phenyl ether; said hydrogenation catalyst comprises palladium; and said method includes heating said dimerized propargyl phenyl ether until molten, thereafter contacting it with said palladium on calcium carbonate while so molten to coat said palladium and subsequently cooling to solidification.

\* \* \* \* \*